United States Patent Office 3,149,742
Patented Sept. 22, 1964

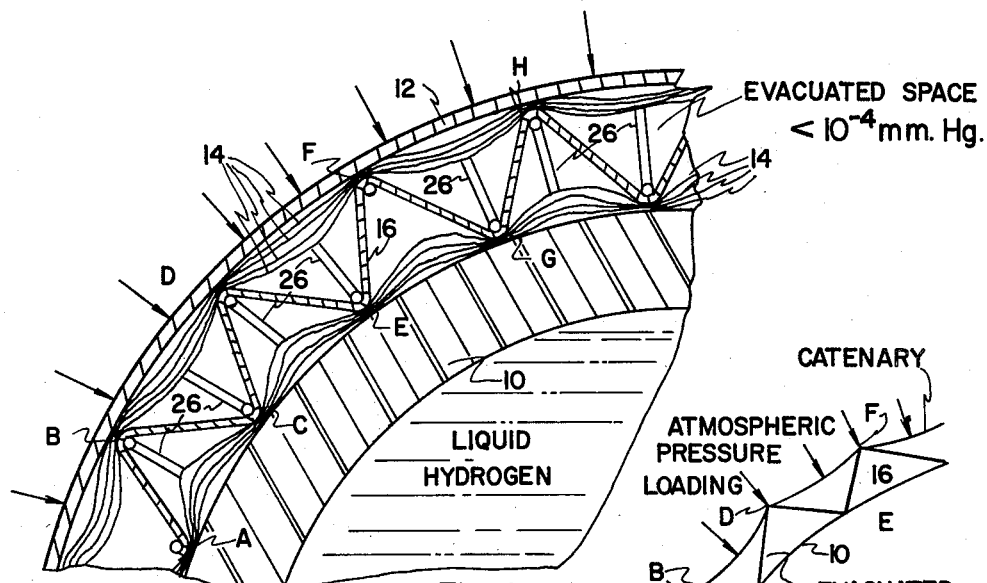
Fig.-1
Fig.-1A
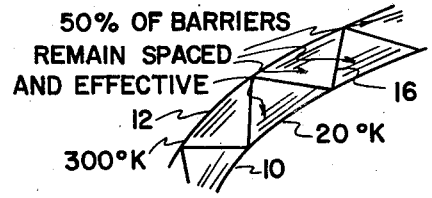
Fig.-1B
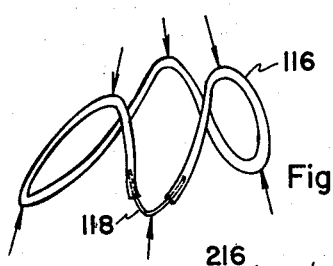
Fig.-2
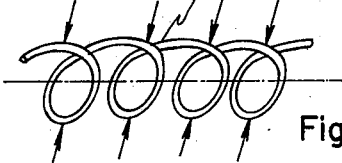
Fig. 3
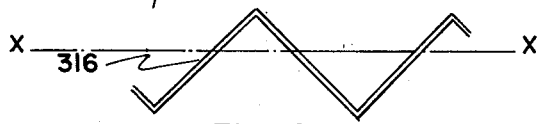
Fig.-4
Fig.-4A  Fig.-4B
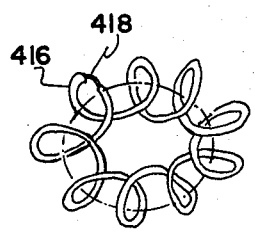
Fig.-5
INVENTOR.
BY

3,149,742
VACUUM DEVICE
Robert Duncan Hay and Milo P. Hnilicka, Jr., Concord, Mass., assignors to National Research Corporation, Cambridge, Mass., a corporation of Massachusetts
Filed Mar. 27, 1963, Ser. No. 268,352
19 Claims. (Cl. 220—10)

This invention relates to containers for storing cryogenic fluids, such as liquid hydrogen and the like, and more specifically to vacuum insulations for such containers. The common mode of storing cryogens is a double walled container with a vacuum maintained in the annular space between the walls. Under conditions of vacuum, radiation is the dominant mode of heat transfer, conduction and convection being negligible in comparison. The present state of the art involves various techniques for providing multiple radiation barriers in the vacuum space without adding new sources of heat input via conduction. Patents 3,018,016 and 3,009,601 of Hnilicka and Matsch, respectively, show the current development of this art.

In insulating cryogens for rockets and other space vehicles, it is desirable to do away with the heavy outer wall of the container as unnecessary weight since outer space will provide the necessary vacuum. This leaves the problem of how to maintain the insulation on the ground prior to take-off; if the external air pressure is permitted to compress the radiation barriers against each other and against the container wall, substantial conduction losses occur. Several approaches have been tried to overcome this difficulty. One is to provide a temporary outer wall which can be removed just prior to launch. This makes it difficult to gain access to portions of the rocket during the critical hours of pre-launch "topping-off." Another approach is to provide a lightweight flexible sheet as an outer wall and to fill the space between the inner and outer walls with a low conductivity purge gas such as helium. However, this involves gas conduction losses which are often prohibitive when liquid hydrogen (or other similar low temperature fluids) is the fluid being stored.

The outer wall of the cryogenic container also presents difficulties in other respects. At the launch pad the substantial pressure differential across this wall requires a rigid supporting structure which must be able to support the heavy loading of atmospheric pressure and must have sufficient rigidity to prevent cave-in and collapse due to inherent instability of vessels subject to external pressure, yet, supporting beams connecting the inner and outer walls must be minimized to reduce the conduction losses. Thus, cumbersome external and internal supporting structures must be provided.

It is therefore a primary object of this invention to provide a cryogenic container which maintains a vacuum in the region of the radiation barriers without the use of a heavy outer wall.

It is a further object to provide a vacuum insulation and support assembly wherein the insulation is free of penetrations.

It is a further object of this invention to provide a cryogenic container with a light-weight outer wall supported from the inner structural wall, or conversely, an inner container with a vacuum insulated space supported from an outer structural wall minimizing solid conduction paths.

These and other objects of the invention will in part be obvious and will in part appear hereinafter.

The invention accordingly comprises the assembled, double-walled, insulated container and its unique parts and sub-assemblies and their arrangement with respect to each other which is exemplified in the following detailed disclosure and the scope of application of which will be indicated in the claims.

For a more complete understanding of the nature and objects of the invention, reference should be had to the following detailed description taken in connection with the accompanying drawings herein:

FIG. 1 is a sectional schematic view of a corner of an insulated container, shown in cross section;

FIG. 1A is a simplified diagram of FIG. 1 showing the structural considerations;

FIG. 1B is a simplified diagram of FIG. 1 showing the heat transfer considerations;

FIG. 2 shows another embodiment of the supporting means shown in FIG. 1;

FIG. 3 shows a third embodiment of the supporting means shown in FIG. 1;

FIGS. 4 and 4A show diagrammatically, a slight variation in the arrangement of the supporting means of FIG. 1, FIG. 4 being a plan view and FIG. 4A an elevation; and FIG. 4B a side view.

FIG. 5 shows another embodiment, combining features of the FIG. 2 and FIG. 3 embodiments.

Referring now to FIG. 1, there is shown a partial section of a cryogenic container made in accord with the invention. The container comprises an inner vessel defined by an annular metallic wall 10. An outer wall 12 is made of an annular band of thin section aluminum or plastic which is impervious to gases and vapors. Multiple radiation barriers 14 are provided in the space between the walls. The barriers comprise layers of ¼ mil thick Mylar coated with a ½ microinch layer of aluminum, as described in the above patent to Hnilicka. The flexible barriers are arranged so that they make only random point contact with each other. Thus the conductivity through the barriers is minimized.

The outer wall is spaced from the inner wall by a series of supports 16, one of which is shown in FIG. 1. The support comprises a rigid wire or capillary tubing of wave form. The wave form causes the wire 16 to bear against the outer and inner walls at different radial locations, A, B, C, etc. The radiation barriers 14 are evenly distributed, half outwardly and half inwardly of the wire 16, with about thirty barriers in each group.

At points A, C, E, and G, the inner group of barriers will be compressed between the wall 10 and the wire 16 transmitting the atmospheric pressure loading. The insulation value of the compressed layers at these points is essentially lost. However, radially outwardly of these points, the outer radiation barriers retain their mutual spacing and are fully effective. Similarly, the outer barriers are compressed between wall 12 and wire 16 at points B, D, F, and H; but inwardly of these points, the inner barriers retain their spacing.

Referring now to FIG. 1A, there is shown a simplified view of this same section of the cryogenic container. The thin aluminum wall 12 is bent into an annular series of caternary curves between points of support B, D, F, etc. These constitute the only support of the wall 12. No external supports are necessary. The rigid metallic wall 10 exerts reaction forces at points A, C, E, etc. The wire 16 acts as the stringers of a truss in this arrangement. The wire 16 is separated from walls 10 and 12 by the radiation barriers (not shown in FIG. 1A) described above. Slippage between the wire and the walls is limited by the caternaries, the endless form of the annular wire, and connecting the wire to other supporting wires, in the manner described below.

Referring now to FIG. 1B, there is shown another simplified view of this same section of the cryogenic container. The most important advantage of the invention is shown here in schematic form. At any given radial location, at least 50% of the radiation barriers maintain their spacing, the prime requisite of effective insulation.

Referring back to FIG. 1, it should be noted that a series of wires 26 of wave form similar to that of wire 16, extend along the evacuated space in a direction perpendicular to the plane of the paper. Thus, a first series of parallel wires 16 crosses a second series of parallel wires 26 to form a supporting grid, making junctions at the crests of their respective waves. The individual stringers provide long paths of small cross-section from wall 12 to wall 10 and therefore do not provide excessive heat inputs due to conduction. The wires are made of epoxy reinforced glass fibers, or similar low thermal conductivity material. This material may be obtained as partially cured, epoxy impregnated webs, then rolled into wire, and cured. The wires can also be metal, preferably of low thermal conductivity. Use of thin walled tubing instead of solid wire offers further reduction of heat losses.

The grid of wires may be reinforced by an additional network of wires connecting the mid points of the stringers in accordance with conventional truss design practice. This can be done without any additional disturbance to the spacing of barriers 14. Since one of the primary purposes of these grids is to transmit and equalize loadings between the inner and outer walls due to internal and external pressures by an arch-like beam formed of wire, preferred configurations of wave formed spacers should feature stereogeometry of inherently rigid structures.

In lieu of the simple grid design shown in the drawings, a geodesic truss can be formed from the wires taking advantage of the circular cross-section of the inner and outer walls, typical of spherical or cylindrical containers.

Referring now to FIG. 2 there is shown an alternate embodiment of the supporting assembly, characterized by closing the ends of wave form wires in an endless ring. In this embodiment wires in wave ring form replace the wire grid of FIG. 1. Because of the high rigidity of closed wiring the loads will be borne at the crests of the waves as indicated by the arrows, leaving at least one half of barriers uncompressed. Such wave rings are distributed through the insulating space out of contact with each other. Again, thin walled tubing instead of solid wires offers further reduction of heat losses.

Referring now to FIG. 3, there is shown an alternate embodiment of the supporting assembly. In this embodiment, wire coils 216 replace the wires of 16 FIG. 1. No crossing grids are provided. Several spirals 26 run around the annular wall 10 of the container and are joined at their ends to form an endless spiral.

The grid arrangement of FIG. 1 may be replaced by a single parallel series of wires, each wire having a zig-zag arrangement, as shown diagrammatically in FIG. 4, a developed plan view, with FIG. 4A being an elevation view of a single wire 316. This balanced form provides increased rigidity. As in FIG. 1, each wire would be endless and would run completely around the annular wall 10 of the container.

It should be understood that references to wire throughout this specification include various forms of low cross-section wires and strips. The best mode of wire is a tubular wire since the primary loading on the wire in all of the embodiments is a bending stress. Elimination of the heat transfer cross-section of the core of the wire does not seriously impair the bending load carrying ability of the wire. One way of making the wave ring of FIG. 2 in accord with this concept would be to insert a Teflon tube of 1/32 inch O.D. and 1/64 inch I.D. in a fibre glass insulating sheath, paint the sheath with epoxy to impregnate it, bend the sheathed wire into the wave ring form of FIG. 2 making a junction at one of the crests and oven curing to produce a rigid wave ring. The junction is made by inserting the legs of a short length of metal wire 118, bent into a V-shape, into the two ends of Teflon tubing to be joined. The length of the metal legs should be less than the length of the legs of the tubing and should be located at the apex of two supports, where the thermal gradient is smallest.

Referring now to FIG. 5, there is shown another form of wave ring. This wave ring 416 is similar to the one shown in FIG. 2, save that in this case the generatrix is a circle rather than the V-shape generatrix of FIG. 2. The ring is made in the same manner as the ring of FIG. 2, the ends being joined by wire 418.

The species of FIGS. 3 and 5 thus comprise small supports, each covering a small, enclosed area of the surface of the container 10. The wires of species of FIGS. 1, 4 and 5, on the other hand, run around the container. In all of the species of FIGS. 1, 2, 3, 4, and 5, it is preferred that each wire be of endless form. However, the wires can be allowed to terminate with some sacrifice of rigidity, within the scope of the present invention. The structural and heat transfer concepts shown in FIGS. 1A and 1B apply to all the species. The form of FIG. 5 is the most rigid, but has the worst stereogeometry because of the close spacing of its coils. The wires 16 of FIG. 1 have the best stereogeometry, but the least rigidity; the crossing wires 26 of their grid arrangement compensate for the latter.

The invention is applicable to various forms of containers. The term "radial," as used herein is used to designate a line extending outwardly from a point on the inner wall of a container in a direction perpendicular to the container, whether the wall of the container is curved or planar at that point. The essential feature of the invention is that the ends of the stringers are offset so that each radial radiation path will pass through at least one group of properly spaced radiation barriers. It is possible that some non-radial radiation paths around the stringers will only pass through compressed barriers. But heat losses due to this will be small in view of the small areas of compressed barrier portions.

While the outer wall 12 of FIG. 1 is desirable, the same stress distributing functions can be performed to some extent by the outer group of barriers 18 when wrapped around the support assembly as a spiral. However, where ambient vacuum conditions are not available, the wall 12 must be provided to hermetically seal the insulating space.

The barriers of the inner and outer groups may be sewn or adhesively attached to the crests of the supporting waves to limit movement. However, the entire crest should not be permitted to penetrate through either insulation group.

Since certain changes may be made in the above apparatus without departing from the scope of the invention herein involved, it is intended that all matter contained in the above description shall be interpreted as illustrative and not in a limiting sense.

What is claimed is:

1. A double-walled insulated container comprising an outer radial series of flexible radiation barriers in the space between the walls and an inner radial series of flexible radiation barriers in the space between the walls, a support assembly between the inner and outer series comprising a distributed set of rigid stringers of thin section, one end of each stringer bearing against the outer wall via the outer series of barriers so that the barriers are compressed at the point of bearing contact, the other end of each stringer bearing against the inner wall via the inner series of barriers so that the barriers are compressed at the point of bearing contact, each stringer being arranged so that the inner and outer points of bearing contact are out of peripheral alignment with each other and said points of bearing contact comprising essentially the only points along the container walls where radiation barriers are compressed so that each radial radiation path passing through the double wall of the container is intercepted by at least one series of properly spaced radiation barriers.

2. The container of claim 1 wherein the outer wall is a flexible sheet adapted to form catenary curves between adjacent bearing points thereon.

3. The container of claim 1 wherein the stringers are formed by endless wires of wave form.

4. The container of claim 1 wherein the inner wall is curved in cross-section.

5. The container of claim 4 wherein the inner wall forms a sphere.

6. The container of claim 4 wherein the inner wall forms a cylinder with domed ends.

7. An insulated vessel for confining a liquefied gas, said vessel having an inner gas-tight wall serving to provide a storage chamber for said liquefied gas, and an insulating member supported outside of said wall, said member substantially completely surrounding said storage chamber in heat shielding relation thereto to prevent any substantial transfer of radiant heat to said storage chamber, said member having a pressure thereabout of less than 1 micron Hg abs., said member comprising inner and outer groups, each of at least 30 layers of metal-coated-nonmetallic flexible plastic material, said layers being assembled to provide between 12 and 120 layers of plastic material per cm. of insulated member thickness, said plastic material being essentially free of any substance having an equilibrium vapor pressure at 20° C. of greater than 10 microns Hg abs., the metal coating on the flexible material having a thickness of less than .25 micron and being sufficiently thick to have an emissivity less than .06, the flexible material having a low heat conductivity to give a low lateral heat conductivity to the metal coated material of less than 10 x 10$^{-6}$ watts per square per ° K. at 300° K., the layers of flexible material being permanently deformed, as by crumpling, so that they tend to be free of extensive areas of planar contact while having numerous point contacts therebetween, the layers of each group being essentially free of spacing elements therebetween, the major portions of said layers being held in spaced relation by said point contacts between layers, the apparent conductivity of each group, when at said low pressure, being less than about 1 microwatt/cm. ° K., and the groups being separated by a supporting assembly comprising stringers extending from the inner group to the outer group and being arranged so that the inner ends of essentially all the stringers are peripherally offset from the outer ends of essentially all the stringers.

8. The insulated vessel of claim 7 further comprising an outer wall enclosing the outer group of barriers, one of said inner and outer walls comprising a structural wall and the other comprising a gas-tight membrane.

9. A supporting assembly for insulation blankets comprising rigid wires bent into wave form and inserted between two layers of insulation.

10. The assembly of claim 9 wherein the pattern of waves is essentially linear.

11. The assembly of claim 10 wherein the linear waves zig-zag back and forth across a generally linear axis.

12. The assembly of claim 10 wherein the waves are endless.

13. The assembly of claim 10 wherein the pattern of waves is a grid with crossing waves meeting at their crests.

14. The assembly of claim 9 wherein the waves are formed from a coiled wire.

15. The assembly of claim 14 wherein the waves are endless.

16. The assembly of claim 14 wherein the coil runs the full length of a characteristic dimension of the blanket, such as the circumference of the blanket when covering a round shape.

17. The assembly of claim 14 wherein the coil turns in upon itself to enclose a small area on the opposed surfaces of the layers of insulation abutting the rigid wire wave form.

18. The assembly of claim 14 wherein the generatrix of the coil is a circle.

19. The assembly of claim 14 wherein the generatrix of the coil is a V shape.

References Cited in the file of this patent

UNITED STATES PATENTS

| | | |
|---|---|---|
| 1,948,477 | Zenner | Feb. 20, 1934 |
| 2,516,405 | Morrison | July 25, 1950 |
| 2,799,425 | Werker | July 16, 1957 |
| 2,919,046 | Parsons | Dec. 29, 1959 |
| 3,009,600 | Matsch | Nov. 21, 1961 |
| 3,018,016 | Hnilicka | Jan. 23, 1962 |
| 3,032,231 | Clark et al. | May 1, 1962 |